United States Patent
Benner et al.

(10) Patent No.: US 6,206,494 B1
(45) Date of Patent: Mar. 27, 2001

(54) ASSEMBLY UNIT WITH AN ASSEMBLY RAIL

(75) Inventors: Rolf Benner; Martina Köhler, both of Herborn; Udo Münch, Sinn; Wolfgang Reuter, Burbach, all of (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/308,296

(22) PCT Filed: Nov. 6, 1997

(86) PCT No.: PCT/EP97/06143

§ 371 Date: May 17, 1991

§ 102(e) Date: May 17, 1991

(87) PCT Pub. No.: WO98/23011

PCT Pub. Date: May 28, 1998

(51) Int. Cl.$^7$ .................................................. A47G 29/00
(52) U.S. Cl. ............................ 312/265.4; 174/50; 211/26
(58) Field of Search ........................... 312/265.1, 265.2, 312/265.3, 265.4, 265.6, 223.1, 263, 351; 52/653.1, 633, 590.1, 730.5, 731.3, 731.5; 211/191, 189, 26; 361/391, 429, 415; 174/50

(56) References Cited

U.S. PATENT DOCUMENTS 5,749,476 * 5/1998 Besserer et al. ................... 312/265.1

FOREIGN PATENT DOCUMENTS

| 88 00 227 | 3/1988 | (DE) . |
| 40 13 371 | 7/1991 | (DE) . |
| 92 05 762 | 10/1993 | (DE) . |
| 42 33 205 | 3/1994 | (DE) . |
| 43 36 187 | 4/1995 | (DE) . |
| 43 36 204 | 4/1995 | (DE) . |
| 195 07 438 | 4/1996 | (DE) . |
| 195 07 437 | 5/1996 | (DE) . |
| 195 37 016 | 10/1996 | (DE) . |
| 2 420 233 | 10/1979 | (FR) . |

OTHER PUBLICATIONS

Rittal Catalogue 27, pp. 178–179, no date.

* cited by examiner

Primary Examiner—Peter M. Cuomo
Assistant Examiner—Jerry A. Anderson
(74) Attorney, Agent, or Firm—Pauley Petersen Kinne & Fejer

(57) ABSTRACT

An assembly unit with assembly cavities, which can be mounted on frame sections of a switching cabinet. One or more assembly elements can be installed on at least one part of the frame sections to support the assembly rail. The assembly rail can be easily secured to a frame section if the assembly rail has at least one profiled side with at least one insert cavity by which the assembly rail can be placed on the fastening element, and the fastening element can be moved in relation to the frame section in order to attach the assembly rail.

13 Claims, 2 Drawing Sheets

ASSEMBLY UNIT WITH AN ASSEMBLY RAIL

BACKGROUND OF THE INVENTION

1. Field of the Invention

This invention relates to an assembly unit with an assembly rail having assembly retainers, which can be fastened on profiled frame sections of a switchgear cabinet, wherein one or several fastening elements for holding assembly rails can be affixed to at least a portion of the profiled frame sections.

2. Description of Prior Art

Such assembly units are known from a company prospectus "Rittal Handbuch 27" [Rittal Manual 27], pp. 178, 179. Assembly units of this type use assembly rails, which can be attached on the profiled frame sections of a rack for a switchgear cabinet.

The assembly rails are embodied as open, multiply beveled hollow profiled sections. The assembly rails have plug retainers on their front ends. Plug-in shoulders of connectors can be inserted into these plug retainers. The connectors are fixedly connected with the assembly rails. The connectors can be bolted to the profiled frame sections by fastening screws. Thus, rows of evenly divided fastening retainers are cut in. Such assembly rails are preferably installed between two vertical profiled frame sections of the rack. Built-in electronic components or the like can be fastened on the assembly retainers of the assembly rails.

SUMMARY OF THE INVENTION

It is one object of this invention to provide an assembly unit of the type mentioned at the outset, wherein the assembly unit can be attached simply, and with little cost, to the profiled frame sections.

This object of this invention is attained with the assembly rail having at least one profiled leg with at least one plug retainer, by which it can be plugged into the fastening element, and the fastening element being adjustable with respect to the vertical profiled frame section for fixing the assembly rail in place.

In order to attach such an assembly rail to a profiled frame section it is initially necessary to provide the profiled frame section with one or several fastening elements in the appropriate positions. Thereafter, the assembly rail with its easily accessible plug retainer on the profiled leg can be pushed onto the fastening element. For final fixation in place it is only necessary at the end to displace the fastening element, so that the assembly rail is braced. In connection with this assembly unit the fastening elements can be assembled independently of the assembly rails. Thus a simple manipulation becomes possible, so that the expenditure of time for assembly is considerably reduced.

In accordance with a preferred embodiment of this invention, the assembly rail is embodied as an open hollow profiled section, the profiled leg maintains the plug retainer in the area of the open profile side, and the plug retainer is open in the direction toward the open profile side.

The plug retainer is easily accessible at the open profile side, so that fastening on the fastening element is easily possible. Furthermore, the assembly rail can be simply produced. For example, the assembly rail can be designed as a stamped and bent element. In this case the plug retainer is hollowed out of the profiled leg.

In order to be able to assemble the assembly rail simply in different positions even in hard-to-reach places, the assembly rail has two profiled legs, which are at an angle with respect to each other and extend in the longitudinal direction of the assembly unit, the two profiled legs each have at least one plug retainer, and the profiled legs can be placed against longitudinally extending interior walls of the profiled frame sections of the rack.

The interior walls of the profiled frame section can be equipped with fastening elements. Depending on the accessibility of the profiled frame section, the fastening elements can be attached to one or the other interior wall. With the profiled legs placed at an angle, it is also possible to perform an alignment and to position the assembly rail on the profiled frame section.

A possible variation of the invention is distinguished in that the profiled leg or legs of the assembly rail has, in addition to the plug retainers, fastening holes which can be aligned flush with respect to threaded retainers of the profiled frame sections, and the fastening elements can be screwed into the fastening holes.

First, the assembly unit is positioned on the profiled frame section and fixed in place by the fastening elements which engage with the plug retainers. For example, if heavy built-in components are to be attached to the assembly rail, additional fastening elements can be fixed in the fastening holes.

An advantageous embodiment of an assembly unit in accordance with this invention is distinguished because the assembly rail is made essentially square or rectangular in cross section from two assembly sections placed at right angles with respect to each other and the profiled legs connected therewith, the assembly sections have assembly retainers embodied as openings, and the assembly retainers provide access to the fastening elements.

The assembly rail can be plugged onto the fastening elements using plug retainers. In order to now achieve a solid connection to the profiles frame section, the fastening elements are accessible through the assembly retainers. It is then possible to actuate the fastening element with a tool, which is inserted into the assembly retainer. A space-saving construction of the assembly rail is achieved in this way. The fastening elements do not project interferingly from the profiled frame section or the assembly rail, where they would limit the installation space.

In this case it is particularly advantageous if the fastening elements are passed through the assembly retainers and can be inserted into the fastening holes.

The screws are accessible to a tool through the assembly retainers. Here, the additional fastening of the assembly rail in the fastening holes can be performed in a simple manner.

In connection with an assembly unit in accordance with this invention the fastening element for the plug retainer is embodied as a screw on whose bolt section the plug retainer is plugged transversely in relation to the center axis of the screw. The screw head can be braced against the associated profiled leg. As the simplest component, the screws can be cost-effectively employed. The screws have an advantage that they hardly limit the installation space with a screw head.

If the assembly rail can be attached, vertically aligned, to the vertical profiled frame sections of the switchgear cabinet, wherein the profiled legs rest against interior walls of the profiled frame sections, which constitute an interior receptacle, then an additional fastening option can be rigged on a vertical profiled frame section.

BRIEF DESCRIPTION OF THE DRAWINGS

This invention will be explained in greater detail using an exemplary embodiment represented in the drawings wherein.

DESCRIPTION OF PREFERRED EMBODIMENTS

Figure 1:
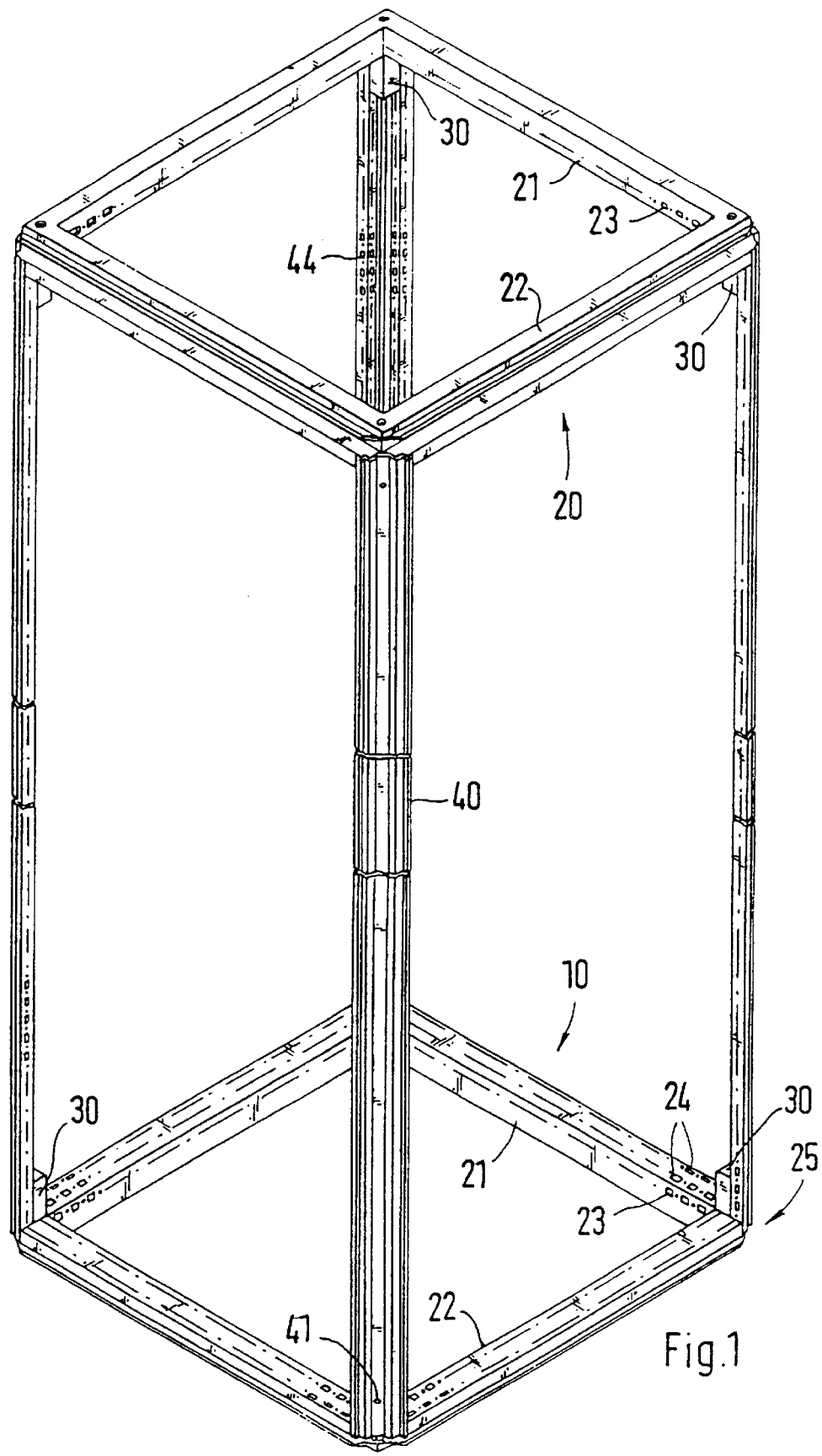
FIG. 1 is a perspective lateral representation of a rack for a switchgear cabinet, comprising profiled frame sections.

A rack for a switchgear cabinet is shown in FIG. 1. The rack essentially comprises a bottom frame 10, a cover frame 20 and four vertical profiled frame sections 40. The vertical profiled frame sections 40 connect the bottom frame 10 with the cover frame 20. The bottom and cover frames 10 and 20 are embodied alike, so that they can be interchanged.

The bottom and cover frames 10 and 20 respectively have two depth and width struts 21, 22. On profiled sides facing the interior of the rack, the depth and width struts 21, 22 have rows of fastening retainers 23, 24. The vertical profiled frame sections 40 also have fastening retainers 44 facing the interior of the rack. Assembly rails 50, for example, can be attached to the fastening retainers 23, 24, 44.

The vertical profiled frame sections 40 are connected via connectors 30 with the bottom, or respectively the cover frame 10, 20. The connectors 30 are arranged in an area of corner retainers 25 of the bottom, or respectively the cover frame 10, 20. Fastening of the vertical profiled frame sections 40 on the connector 30 is accomplished with a screw connection, for example. Thus the vertical profiled frame sections 40 can have screw retainers 41 at their ends.

Figure 2:
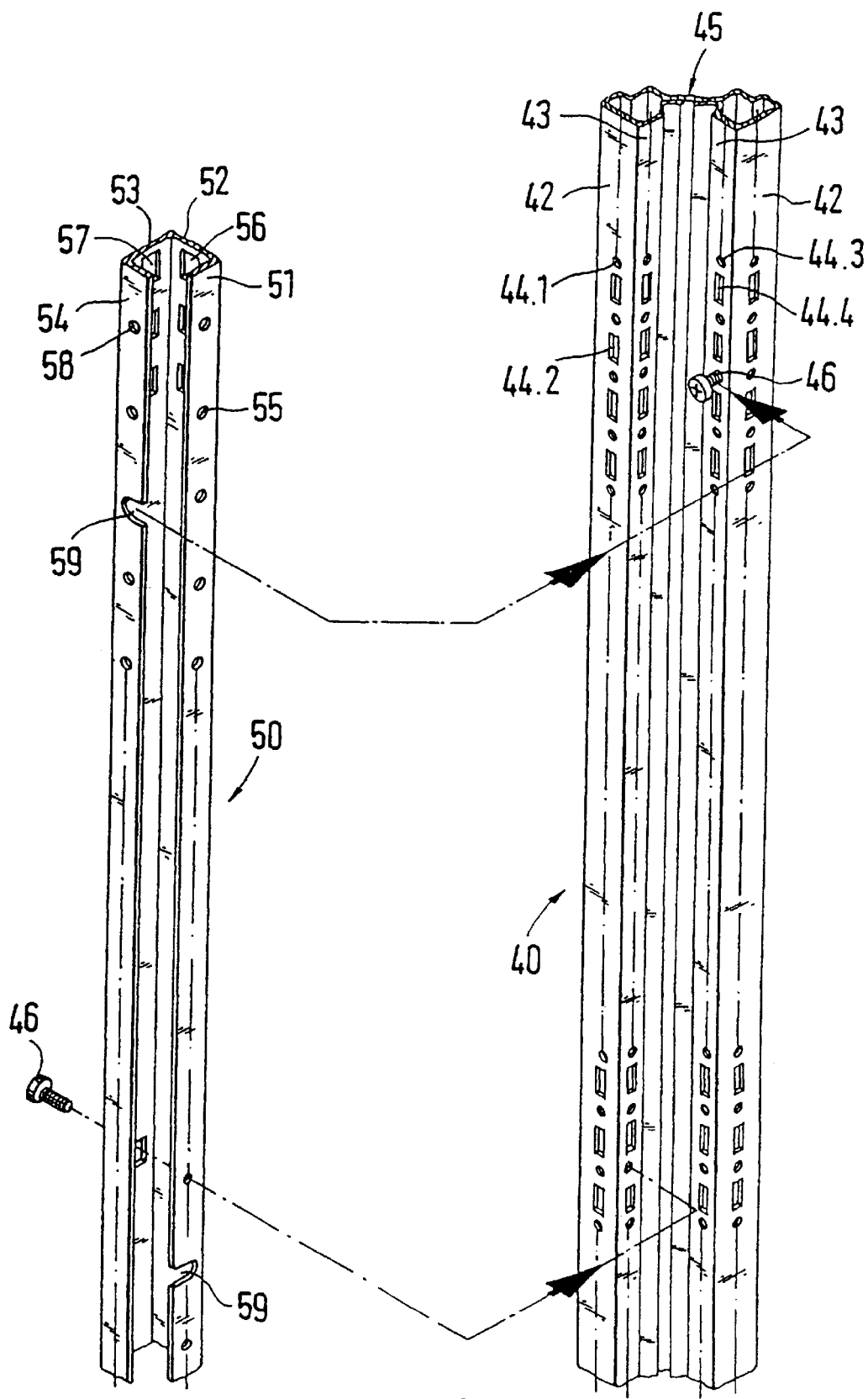
FIG. 2 is an exploded perspective view of a vertical frame leg of the profiled frame section in accordance with FIG. 1 and an assembly rail.

An assembly rail 50 attachment to one of the vertical profiled frame sections 40 is shown in greater detail in FIG. 2. Only a portion of the vertical profiled frame section 40 is shown in the drawing of FIG. 2. The assembly rail 50 is of a length corresponding to this portion. The assembly rails 50 can be attached in sections at any arbitrary location along the vertical profiled frame section 40. The assembly rails 50 can vary in their length. For example, the assembly rails 50 can also extend over the entire axial length of the vertical profiled frame sections 40.

The vertical profiled frame section 40 has two interior walls 43, which are at right angles to each other and form an interior receptacle 45, which is oriented toward the interior of the rack. Respectively one profiled side 42 adjoins the two interior walls 43 at right angles. The profiled sides 42 extend vertically with respect to the associated exteriors of the rack. The profiled sides 42 and the interior walls 43 have rows of fastening retainers 44.1 to 44.4, which are cut in evenly divided. Slit-shaped openings and bores are alternatingly used as fastening retainers. Fastening elements 46, in the present embodiment screws, can be turned into the bores. The fastening elements 46 permit the positioning and fixing in place of the assembly rail 50.

The assembly rail 50 is constructed with a square cross section formed by two assembly sections 52, 53, attached at right angles to each other, and two profiled sections 51, 54. The profiled sections 51, 54 are respectively beveled on the free ends of the assembly sections 52, 53. A hollow profiled section is formed in this way, which is open in the area between the profiled sections 51, 54. Assembly retainers 56, 57 are cut into the assembly sections 52, 53. Fastening holes 55, 58 are stamped out of the profiled sides 51, 54. The assembly retainers 51, 54 and the fastening holes 55, 58 are arranged evenly divided with respect to each other. In this case, the fastening holes 55, 58 are arranged in such a way, that they are flush with an assembly retainer 56, 57 of the assembly section which extends parallel with the respective profiled section. Thus, the fastening holes 55, 58 are accessible through the assembly retainers 56, 57.

Plug retainers 59 are cut into the profiled sides 51, 54 for fastening the assembly rail 50 on the vertical profiled frame section 40. The plug retainers 59 are designed slit-shaped and open in the direction toward the free vertical end of the profiled sections 51, 54. In this case, one plug retainer 59 is used per profiled section 51, 54. For fixing the assembly rail 50 in place, first a fastening element 46 is screwed into a fastening retainer 44.3 of the vertical profiled frame section 40. Whichever of the interior walls 43 of the profiled frame section 40 the fastening element or screw 46 is screwed, is freely selectable and is essentially determined by accessibility. The assembly rail 50 is placed with its plug retainer 59 of the profiled section 54 on the bolt section of the screw. This plugging movement is symbolized by the representation of the arrow in FIG. 2. After the assembly rail 50 is attached to the profiled frame section 40, it is prepositioned. The screw head of the screw is accessible for a tool through an assembly retainer 56 of the assembly section 52, which is arranged flush with the plug retainer 59. When the screw is turned further into the fastening hole 44.3, the screw head is braced on the profiled section 54 in such a way that the assembly rail 50 is drawn into the interior receptacle 45 of the profiled frame section 40. The assembly rail 50 is exactly aligned on the profiled frame section 40.

For additional fastening, screws can be passed through individual assembly retainers 56, 57, inserted into the fastening holes 55, 58 and screwed into the respectively associated fastening retainer 44.3 in the interior wall 43. Depending on the type and size of the load exerted on the assembly rail 50, one or several additional fastening elements 46 can be used.

What is claimed is:

1. In an assembly unit with an assembly rail having assembly retainers, which is fastened on a vertical profiled frame section of a switchgear cabinet, wherein one or several fastening elements for holding the assembly rail can be affixed to at least a portion of the profiled frame section, the improvement comprising:

the assembly rail (50) having at least one profiled leg (51, 54) with at least one plug retainer (59) plugged into one fastening element (46), the fastening element (46) adjustable with respect to the vertical profiled frame section (40) for fixing the assembly rail (50) in place, the assembly rail (50) formed as an open hollow profiled section, and the plug retainer (59) formed as an opening extending from an edge of the at least one profiled leg (51, 54) to fit the fastening element (46) as the at least one profiled leg (51, 54) slides into a position adjacent the profiled frame section.

2. In the assembly unit in accordance with claim 1, wherein the assembly rail (50) is attached, vertically aligned, to the vertical profiled frame section (40) of the switchgear cabinet, wherein the at least one profiled leg (51, 54) rests against an interior wall (43) of the profiled frame section (40).

3. In the assembly unit in accordance with claim 1, wherein two of the profiled legs (51, 54) are at an angle with respect to each other and extend in a longitudinal direction of the assembly unit (50), the two profiled legs (51, 54) each have at least one plug retainer (59) and can be placed against longitudinally extending interior walls (43) of the profiled frame sections (40) of the rack.

4. In the assembly unit in accordance with claim 3, wherein the two profiled kg (51, 54) of the assembly rail (50) each has a plurality of fastening holes (55, 58) aligned flush with respect to threaded retainers (44.3) of the profiled frame sections (40), and the fastening element (46) is screwed into one of the fastening holes (55, 58).

5. In the assembly unit in accordance with claim 4, wherein the assembly rail (50) is one of square and rectangular in cross section resulting from two assembly sections (52, 53) placed at right angles with respect to each other and connected to the profiled legs (51, 54), the assembly sections (52, 53) have a plurality of assembly retainers (56, 57) embodied as openings, and the assembly retainers (56, 57) provide access to the fastening element (46).

6. In the assembly unit in accordance with claim 5, wherein the fastening element (46) is passed through the assembly retainers (56, 57) and inserted into the fastening holes (55, 58).

7. In the assembly unit in accordance with claim 6, wherein the fastening element (46) for the plug retainer is a screw, and the plug retainer (59) is plugged transversely in relation to a center axis of the screw.

8. In the assembly unit in accordance with claim 7, wherein the assembly rail (50) is attached, vertically aligned, to the vertical profiled frame section (40) of the switchgear cabinet, wherein the profiled legs (51, 54) rest against a plurality of interior walls (43) of the profiled frame section (40), which constitute an interior receptacle (45).

9. In the assembly unit in accordance with claim 1, wherein the fastening element (46) for the plug retainer is a screw, the plug retainer (59) is plugged transversely in relation to a center axis of the screw.

10. In the assembly unit in accordance with claim 1, wherein the at least one profiled leg (51, 54) of the assembly rail (50) has a plurality of fastening holes (55, 58) aligned flush with respect to threaded retainers (44.3) of the profiled frame sections (40), and the fastening element (46) is screwed into one of the fastening holes (55, 58).

11. In the assembly unit in accordance with claim 1, wherein the assembly rail (50) is one of square and rectangular in cross section resulting from two assembly sections (52, 53) placed at right angles with respect to each other and connected to the at least one profiled leg (51, 54), the assembly sections (52, 53) have a plurality of assembly retainers (56, 57) embodied as openings, and the assembly retainers (56, 57) provide access to the fastening element (46).

12. In the assembly unit in accordance with claim 11, wherein the fastening element (46) is passed through the assembly retainers (56, 57) and inserted into one of the fastening holes (55, 58).

13. In an assembly unit with an assembly rail having assembly retainers, which is fastened on a vertical profiled frame section of a switchgear cabinet, wherein one or several fastening elements for holding the assembly rail can be affixed to at least a portion of the profiled frame section, the improvement comprising:

the assembly rail (50) having two profiled legs (51, 54) each with at least one plug retainer (59) plugged into one fastening element (46), the fastening element (46) adjustable with respect to the vertical profiled frame section (40) for fixing the assembly rail (50) in place, the two profiled legs (51, 54) positioned at an angle with respect to each other and extending in a longitudinal direction of the assembly unit (50), the two profiled legs (51, 54) each having at least one plug retainer (59) and can be placed against longitudinally extending interior walls (43) of the profiled frame sections (40) of the rack.

\* \* \* \* \*

UNITED STATES PATENT AND TRADEMARK OFFICE
CERTIFICATE OF CORRECTION

PATENT NO. : 6,206,494 B1
DATED : March 27, 2001
INVENTOR(S) : Rolf Benner, Martina Köhler, Udo Münch, and Wolfgang Reuter It is certified that error appears in the above-identified patent and that said Letters Patent is hereby corrected as shown below:

Title page,
Of the Letters Patent after "§ 371 Date:" delete "May 17, 1991" and insert -- May 17, 1999 --.

Title page,
Of the Letters Patent after "§ 102(e) Date:" delete "May 17, 1991" and insert -- May 17, 1999 --.

Signed and Sealed this

Fourth Day of September, 2001

Attest:

NICHOLAS P. GODICI
Attesting Officer
Acting Director of the United States Patent and Trademark Office